Fig. I

Harold A. Ricards
Zigmond W. Wilchinsky Inventors
Howard W. Anderson
By [signature] Attorney Harold A. Ricards
Zigmond W. Wilchinsky Inventors
Howard W. Anderson
By Byron O. Dimmick Attorney HIGH EFFICIENCY HYDROCARBON SEPARATION PROCESS EMPLOYING MOLECULAR SIEVE ADSORBENTS Filed April 26, 1957 4 Sheets-Sheet 3

Harold A. Ricards
Zigmond W. Wilchinsky Inventors
Howard W. Anderson
By Byron O. Dimmick Attorney Harold A. Ricards
Zigmond W. Wilchinsky Inventors
Howard W. Anderson
By Byron O. Dimmick Attorney United States Patent Office 2,988,502

Patented June 13, 1961

1

2,988,502

HIGH EFFICIENCY HYDROCARBON SEPARATION PROCESS EMPLOYING MOLECULAR SIEVE ADSORBENTS

Harold A. Ricards and Zigmond W. Wilchinsky, Westfield, N.J., and Howard W. Anderson, Berkeley, Calif., assignors to Esso Research and Engineering Company, a corporation of Delaware Filed Apr. 26, 1957, Ser. No. 655,329

6 Claims. (Cl. 208—310)

This invention concerns improvements in the art of selectively separating hydrocarbons of different types when using adsorbents of the type commonly known as molecular sieves. The invention is particularly directed to a process for effecting the adsorption and desorption of molecular sieve adsorbents under optimum conditions of time so as to obtain the most efficient use of the adsorbent material.

It has been known for some time that certain natural zeolites have the property of preferentially adsorbing certain types of hydrocarbons from mixtures of the same with other hydrocarbons, as for example removing normal paraffinic hydrocarbons from mixtures of the same with isomeric branched chain hydrocarbons, cyclic hydrocarbons and so on. These zeolites are characterized by having crystal patterns such that they present structures containing a large number of pores of exceptionally uniform size. Only molecules that are small enough to enter the pores can be adsorbed by the zeolites, although not all molecules that can enter the pores will be adsorbed, because an affinity of the molecule for the adsorbent must also be present.

The pores in different zeolites may vary in diameter from less than 4 A. up to 15 or more angstroms, but for any one zeolite, the pores are of substantially uniform size. Because of these properties of uniform small pore size and of selective adsorption for certain molecules in preference to others, such zeolites are known as molecular sieves.

Among the naturally occurring zeolites that have molecular sieve properties are included analcite and chabazite. Zeolites differ from each other in chemical composition but they may be generally characterized as alkali metal or alkaline earth metal alumino-silicates. Analcite has the empirical formula $NaAlSi_2O_6.H_2O$ while that of chabazite is $CaAl_2Si_4O_{12}.6H_2O$. Certain synthetic zeolites also have molecular sieve properties. For example, the Barrer patent, U.S. 2,306,610 teaches the use of a molecular sieve having the formula $(CaNa_2)Al_2Si_4O_{12}.2H_2O$. Also, Black in U.S. Patents 2,442,191 and 2,522,426 describes a synthetic molecular sieve having the formula $$4CaO.Al_2O_3.4SiO_2$$

An extended discussion of molecular sieves will also be found in articles by Breck and others, appearing in Journal of the American Chemical Society, vol. 78, page 5963 et seq. (December 1956).

Methods for separating the various types of hydrocarbons such as aliphatics from aromatics, straight chain from branched chain hydrocarbons and so on, from mixtures of hydrocarbons, have assumed increased importance in industry with the realization that specific structures contribute particular properties for the uses that are made of the particular hydrocarbons. Thus, for example, it is known in the petroleum industry that in the preparation of motor fuels the presence of normal paraffinic hydrocarbons leads to low octane ratings for the fuels, whereas branched chain hydrocarbons and aromatic hydrocarbons contribute to high octane ratings. Thus it is important to be able to remove normal paraffins from light naphthas and thereby upgrade the octane rating of the naphthas. The normal paraffins thus removed may be subjected to reforming or isomerization processes to convert them to other hydrocarbons of higher octane rating for blending into gasoline.

2

One of the particularly attractive methods for removing normal paraffinic hydrocarbons from a light naphtha is to contact the naphtha with molecular sieves having a pore diameter of 5 A. for example. Such a sieve will absorb straight chain paraffin hydrocarbons in preference to branched chain or cyclic hydrocarbons. In a commercial process it is necessary to employ a cyclic operation, that is, one involving an adsorption step followed by a desorption step and then a second adsorption step, and so on. In such a cyclic process it is obviously advantageous to set the cycle times so that maximum use is made of the adsorbent material and essentially no operating time is wasted in contacting the feed beyond the time necessary for adsorption before the desorption step is begun.

It is an object of this invention to provide a cyclic adsorption-desorption process, employing a molecular sieve adsorbent for the separation of normal hydrocarbons from mixtures with other hydrocarbons, wherein maximum efficiency in the use of the adsorbent is obtained.

In accordance with the present invention, the molecular sieve adsorbent particles are in contact with the feed for a period of time no longer than the time required to attain adsorption of from 75 percent to 90 percent of the amount of hydrocarbon that would be adsorbed in an infinite time, and in no case longer than about 4 minutes. Furthermore, in order to effect the most efficient removal of adsorbate from the molecular sieve, desorption from the sieve is begun essentially immediately after the termination of the adsorption step. The invention is particularly directed, although not limited, to cyclic operations in which desorption is effected by reducing the total amount of adsorbed hydrocarbon on the sieve, as by raising the temperature or by reducing the pressure, or both, with or without the aid of a relatively inert purge gas such as nitrogen. This invention is particularly adapted to absorption processes employing molecular sieves having pore sizes in the range of from 4 A. to 6 A.

The nature and objects of the invention will be more readily understood when reference is made to the accompanying drawing, in which FIGURE 1 is a schematic flow diagram illustrating application of the invention to a fixed bed process;

The process may be illustrated by describing the treatment of a light virgin naphtha having a boiling range of about 150 to 200° F. and a research octane rating, unleaded, of about 70. A typical naphtha of this boiling range may contain 20 to 25 percent of normal paraffin hydrocarbons, principally normal hexane, with a minor amount of normal heptane, the remaining material consisting principally of 6 and 7 carbon atom branched chain paraffins and cyclic hydrocarbons. Essentially only normal paraffins will be adsorbed from such a naphtha on a molecular sieve of 5 A. size.

Figure 1:
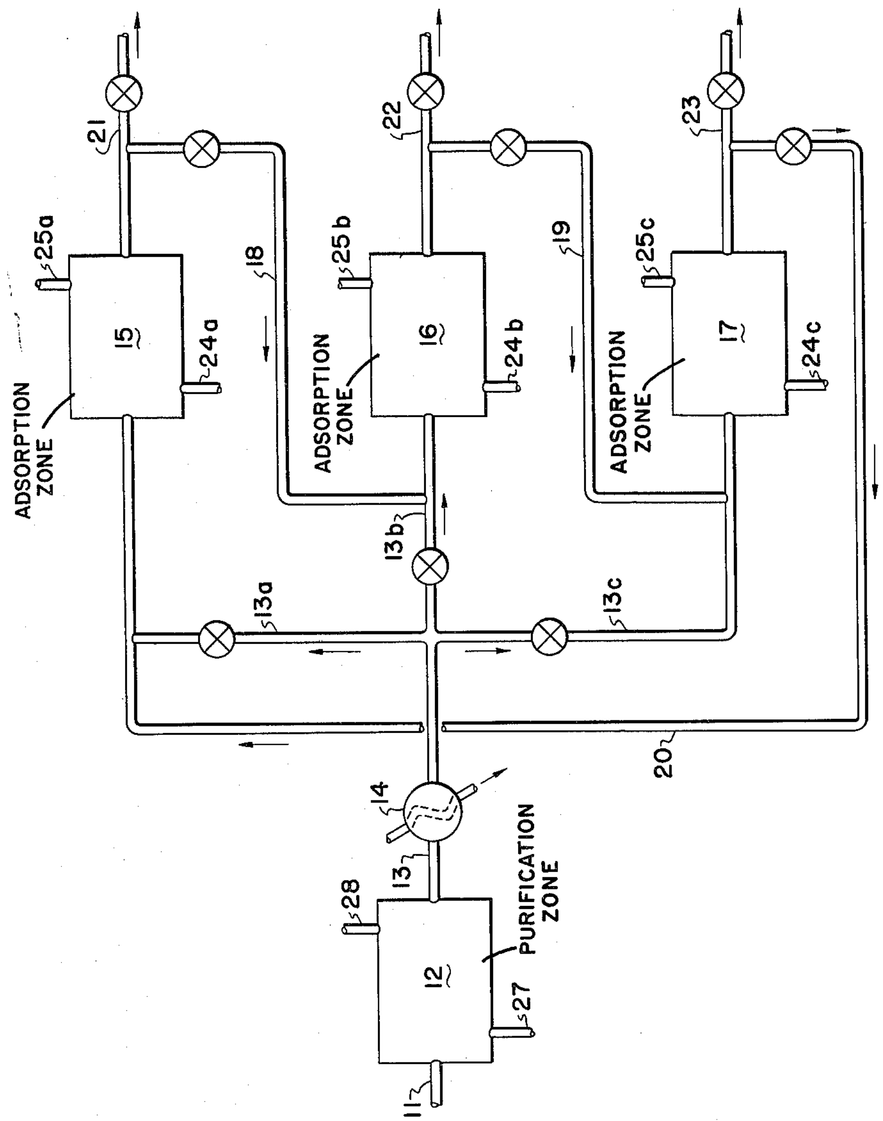

With particular reference to the drawing, FIGURE 1 diagrammatically illustrates application of the invention to a fixed bed process. The vaporized feed that is to be treated is heated to a temperature of from 200 to 400° F., preferably 250 to 300° F., and conducted into an adsorption zone containing a bed of molecular sieve of 5 A. pore size. It may be preferred to pass the feed through a purifying zone to remove the moisture before the feed enters the adsorption zone because the capacity of the molecular sieves to adsorb hydrocarbons is greatly reduced if water is present even in small quantities. Therefore, in the preferred mode of operation of the invention the feed is first passed by means of line 11 into a preliminary purification or drying zone 12 containing a suitable drying agent such as molecular sieves of 4 A. pore size, or silica gel for example. The adsorptive material in the purification zone 12 may also serve to remove sulfur compounds and other materials that might be difficult to desorb from the main adsorption beds, and thus tend to build up in those beds and reduce their adsorptive capacity.

Although only one purification or pretreating zone 12 is shown in the drawing, it will be obvious that at least two such zones will be necessary, the feed being switched from one zone to another when it is desired to regenerate the pretreating or purification zone. Such regeneration may be accomplished by sweeping out the zone with hot gases such as air, the latter entering the zone through line 27 and leaving through line 28. It is of course to be understood that a clean dry feed may not require this purification treatment.

The treated feed is conducted through line 13 to a heat exchanger 14 to preheat it to the desired adsorption temperature and is then conducted by means of line **13*a*, 13*b*, or 13*c* into one of a series of three adsorption zones 15, 16 or 17. These zones are arranged in series so that the feed will pass through two of them while the third is being subjected to a desorption or regeneration step. Assuming that zone 15 is being desorbed, the feed will enter zone 16 through line 13*b* and will flow from zone 16 into zone 17 through line 19 and leave zone 17 through line 23. Control analysis of the effluent from the first bed is made to determine when breakthrough has occurred and also when the effluent has attained a composition in which the normal paraffin content is from 75 to 90 percent of the normal paraffin content of the feed. Flow rates are adjusted so that the time to breakthrough and the time from breakthrough to the condition of 75 to 90 percent adsorption saturation are about equal. Then in operating the process the feed to each bed is cut off when the 75 to 90 percent saturation point has been reached. Each bed when it is then cut off is immediately subjected to a desorption step in which vacuum is applied by means of one of the lines 25*a*, 25*b* or 25*c*. Desorption may also be aided by introducing a purge gas such as nitrogen or methane through line 24*a*, 24*b*, or 24*c***.

Figure 2:
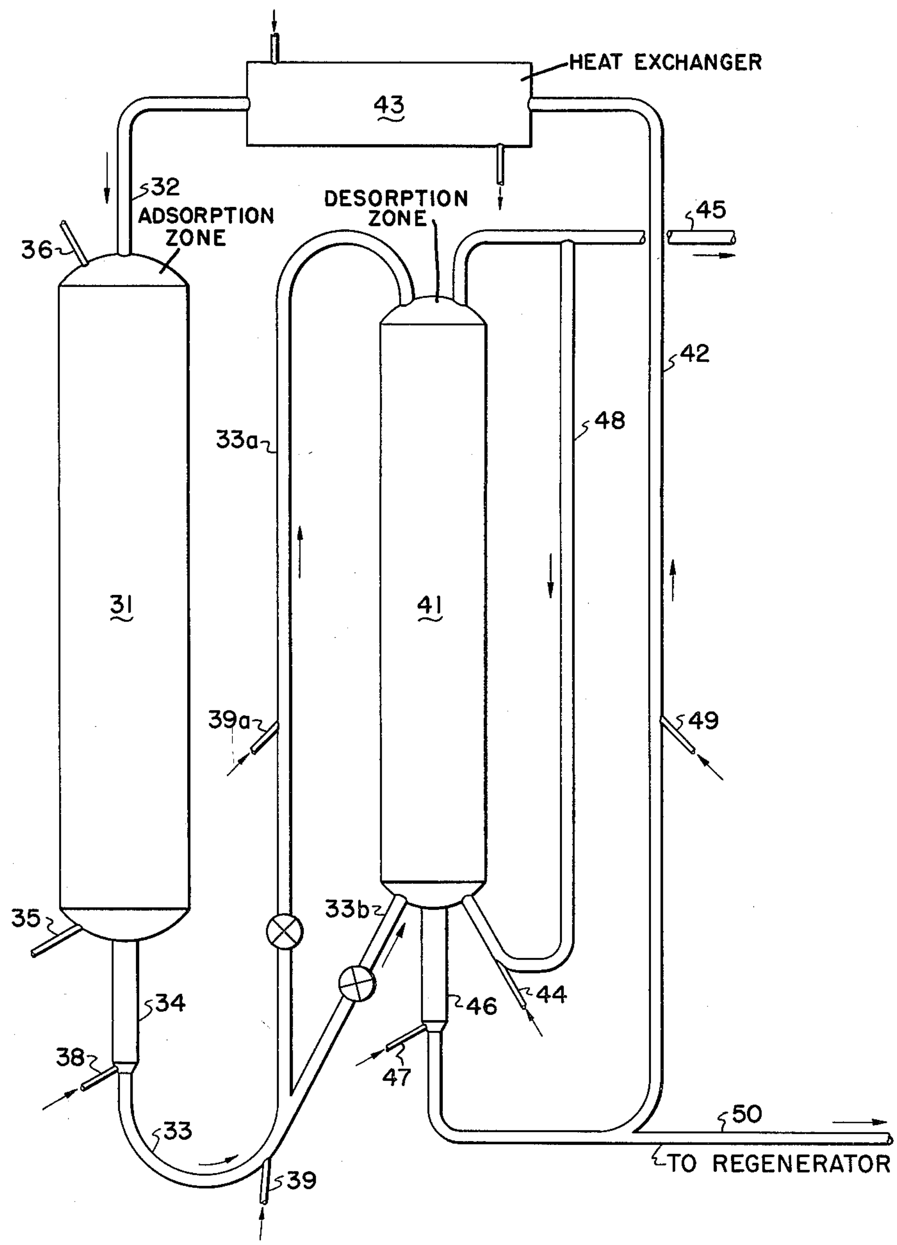
FIGURE 2 is a schematic flow diagram illustrating application of the invention to a moving bed system.

In view of the desirability for desorbing each bed as soon as possible following the adsorption step, the fixed bed process must necessarily be limited to isothermal operations, since the time required to raise the temeprature of the bed would be unduly long. Thus the process of this invention is more easily adapted to operations of the moving bed type. One manner in which a moving bed operation may be conducted is illustrated in FIGURE 2. Referring to FIGURE 2, an adsorption zone 31 is provided through which a moving bed of molecular sieves is conducted, the sieve entering through line 32 and leaving the zone through line 33. The feed to be subjected to the adsorption step may enter through line 35 and leave through line 36 if countercurrent operation is desired, or may enter through line 36 and leave through line 35 if concurrent operation is desired. Countercurrent operation is preferred. To improve the efficiency of operation it is preferred that the sieve particles leaving zone 31 first pass through auxiliary zone 34 where they encounter a small trickle stream of desorbate hydrocarbons flowing into the zone 34 through line 38. This treatment ensures that the sieve particles leaving zone 31 will be essentially free of feed.

The sieve particles are conducted by means of line 33 into a desorption zone 41 which is maintained at a much higher temperature than the temperature in the adsorption zone. For example the temperature in the adsorption zone may be 250° F., whereas the temperature in the desorbing zone may be 600° F. to 800° F. The higher temperature in the desorption zone may be attained by heating coils or by a moving bed of heated shot particles or by other suitable means. One desirable way to maintain the desorbing temperature is to recycle a stream of desorbate by means of line 48. The desorbing step may be aided by introducing hot purge gas through line 44. Desorbate leaves the zone through line 45.

The bed of molecular sieve particles in zone 41 may be either a downwardly moving bed or it may be a fluidized bed. For a moving bed operation it is preferred that the sieve particles to be desorbed enter the zone at the top through line **33*a*. For a fluidized bed the particles may enter below the top of the fluidized bed, as by means of line 33*b*. To transfer the particles through line 33*a* or 33*b*, streams of a suspending gas are introduced through lines 39 and 39*a*. This gas is preferably either an inert gas of the type introduced through line 44 or it may be a stream of the desorbate from line 45. The desorbed molecular sieve leaves the desorbing zone through line 42 and is conducted back to line 32 to re-enter the adsorption zone, passing through heat exchanger 43 to reduce its temperature to the temperature of the adsportion zone. To aid in the transfer of desorbed sieve through line 42 a small stream of suspending gas is introduced into that line through line 49. The suspending gas is preferably a stream of the same feed that is entering zone 31 through line 35 or 36. Preferably the desorbed sieve leaving zone 41 passes through an auxiliary zone 46 where it encounters a small trickle stream of feed entering through line 47. This treatment ensures that the desorbed sieve particles are not surrounded by desorbate vapor, hence, on subsequent cooling the sieve will not re-adsorb the desorbate, but will be in condition to adsorb normal paraffins from the feed in zone 31. A small proportion of the recycled desorbed sieve is removed from line 42 through line 50** to a regeneration zone (not shown). Regeneration is accomplished by burning or by steam stripping.

With a moving bed system of the type shown in FIGURE 2, the time of contact between the feed and the molecular sieve adsorbent can be very closely controlled. For a given feed of essentially constant composition and for a given type of molecular sieve, the optimum time to attain 75 to 90 percent of complete adsorption can be determined in a pilot run in a fixed bed and the flow rates of feed and sieve adsorbent in zone 31 adjusted accordingly. Also, the system can be so designed that the time of transfer from zone 31 to zone 41 will be no more than 2 minutes, in order that desorption can be effected as soon as possible following the adsorption step.

Figure 3:
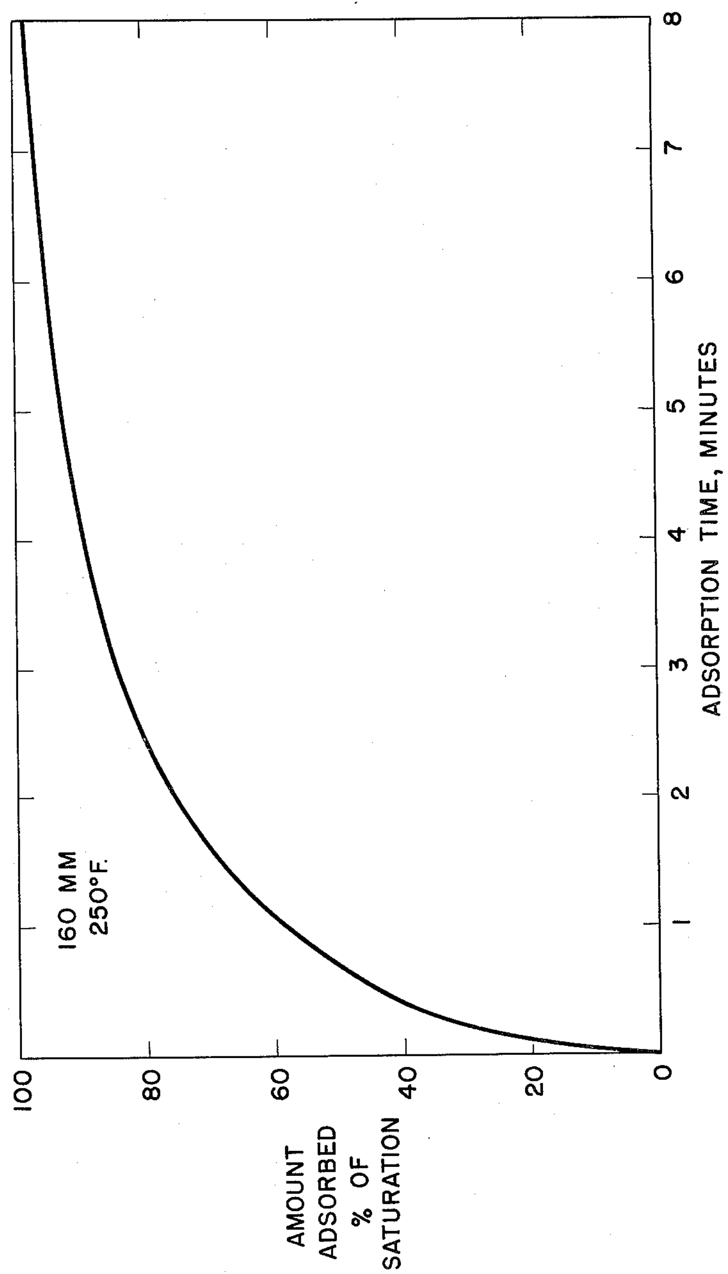
FIGURE 3 is a graph showing the adsorption rate of normal hexane on a 5 A. zeolite molecular sieve to illustrate the principle on which the invention is based.

The principle on which this invention is based will be understood when reference is made to FIGURE 3 which presents a plot of adsorption rates for normal paraffins on a vacuum-desorbed 5 A. zeolite molecular sieve versus adsorption time at a temperature of 250° F. and at a vapor pressure of 160 mm. This rate curve was determined from pilot plant studies with a virgin naphtha containing 20 percent normal paraffins, primarily normal hexane. Examination of this curve indicates that, for the first minute of adsorption, the rate is very rapid and that the rate begins to fall off after about 75 percent of the adsorption capacity has been attained. Adsorption up to 90 percent of capacity is attained in the next 2 or 3 minutes, so that after about 4 minutes the adsorption rate is very slow. It is therefore uneconomical to continue the adsorption for longer periods of time to raise the adsorption to 100 percent. Accordingly, it is advantageous to operate the process only until from about 75 percent to 90 percent of the total adsorption capacity has been attained. Generally this will be no longer than 4 minutes.

Other studies have shown that the time required for saturating the molecular sieve decreases as the partial pressure of the n-paraffins increases. It therefore follows that the cycle time can be kept at a minimum by conducting the vapor phase adsorption at a pressure close to the liquefaction pressure of the feed.

Figure 4:
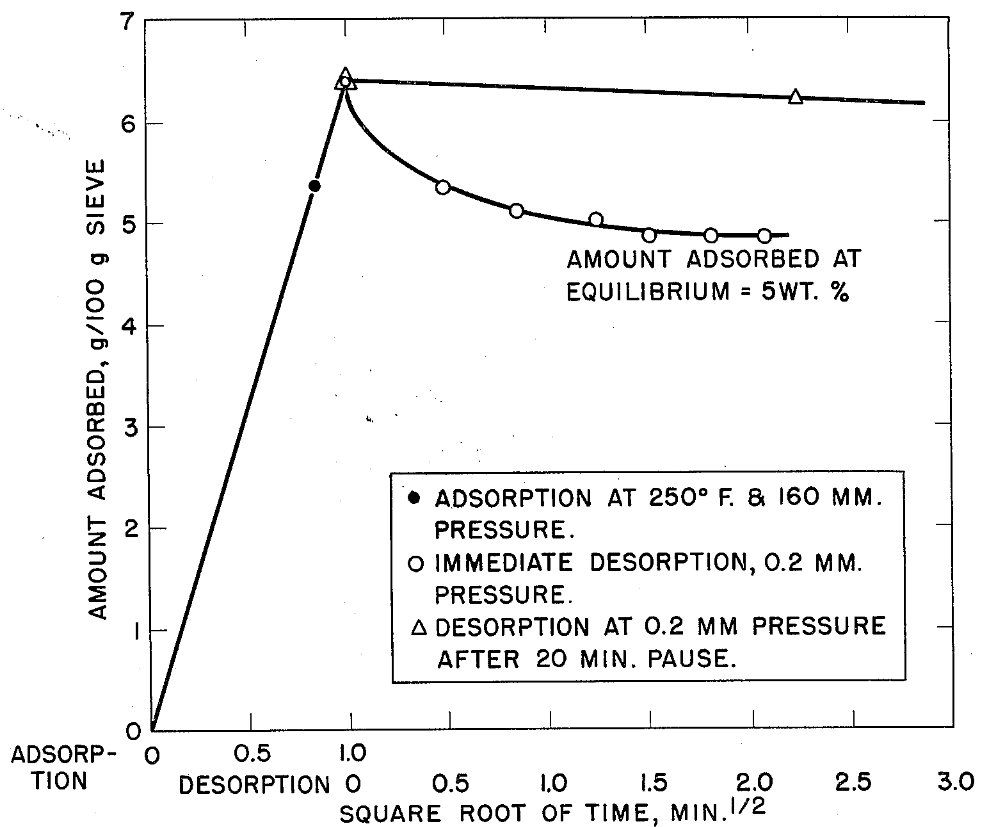
FIGURE 4 is a graph showing the effect of delaying the desorption time after adsorption when desorbing hexane from a 5 A. molecular sieve.

As previously stated, it is also a feature of this invention that desorption is begun as soon as practically possible after the adsorption step. FIGURE 4 presents a plot of adsorption and desorption rates for normal hexane on a 5 A. zeolite molecular sieve at 250° F. It will be seen from the graph that when desorption was effected by reducing the pressure from 160 mm. to 0.2 mm. immediately following adsorption, the amount of adsorbed material was reduced from 6.5 weight percent to 5.0 weight percent, whereas when a period of 20 minutes elapsed between adsorption and desorption, the amount remaining adsorbed could be reduced from 6.5 percent only to about 6.2 percent.

When this invention is employed as a fixed bed process, adsorption and desorption are preferably operated at the same temperature, with the pressure during adsorption being somewhere in the range between atmospheric pressure and the liquefaction pressure of the feed and the pressure during desorption being preferably no greater than about 50 mm. of mercury. When the invention is employed as a moving bed process, there will be relatively little or no difference in pressure between the adsorption zone and the desorption zone while considerable differences in temperature will exist between the zones, adsorption being preferably conducted at from 200 to 400° F. and desorption preferably at 600–800° F.

It is not intended that this invention be limited by any theory of operation nor that it be limited by the specific examples given. The scope of the invention is to be determined only by the following claims.

What is claimed is:

1. A process for the separation of normal paraffin hydrocarbons from mixtures therewith with other hydrocarbons which comprises contacting a vaporized stream of the said mixtures with a crystalline alumino-silicate zeolite adsorbent for a period of less than 4 minutes and sufficient only to attain adsorption of from 75 to 90 percent of the total amount of normal paraffin hydrocarbons that would be adsorbed in an infinite time, terminating the contacting step, and within two minutes thereafter commencing to desorb the adsorbed hydrocarbons.

2. Process as defined by claim 1 wherein said molecular sieve adsorbent has pore sizes of from 4 to 6 angstroms.

3. Process as defined by claim 1 wherein said desorption is conducted in a manner reducing the total amount of adsorbed hydrocarbons on the molecular sieve.

4. Process as defined by claim 1 wherein said desorption is effected at an elevated temperature with the aid of a purge gas.

5. Process as defined by claim 1 wherein said desorption is effected by reducing the pressure to a value no greater than about 50 mm. of merucry.

6. A process for the separation of normal paraffin hydrocarbons from mixtures therewith with other hydrocarbons which comprises contacting vaporized streams of said mixtures with a crystalline alumino-silicate zeolite adsorbent in a contacting zone, moving said mixture and said sieve through said zone at a rate effecting a contact time of less than 4 minutes, said contact time being sufficient only to attain on said molecular sieve adsorption of from 75 to 90 percent of the total amount of normal paraffin hydrocarbons that would be adsorbed in an infinite time, terminating the contact step and removing molecular sieve adsorbent and adsorbed hydrocarbons from said zone, conducting said removed adsorbent to a desorbing zone and within two minutes after terminating said contacting step desorbing said adsorbed hydrocarbons from said removed adsorbent in said desorbing zone, and thereafter recycling desorbed molecular sieve to said adsorption zone.

References Cited in the file of this patent

UNITED STATES PATENTS

| | | |
|---|---|---|
| 2,487,805 | Hermanson | Nov. 15, 1949 |
| 2,522,426 | Black | Sept. 12, 1950 |
| 2,574,434 | Greentree et al. | Nov. 6, 1951 |
| 2,776,250 | Capell et al. | Jan. 1, 1957 |
| 2,818,137 | Richmond et al. | Dec. 31, 1957 |
| 2,818,455 | Ballard et al. | Dec. 31, 1957 |
| 2,843,219 | Habgood | July 15, 1958 |
| 2,859,256 | Hess et al. | Nov. 4, 1958 |

OTHER REFERENCES

Barrer et al.: Chemical Society Journal (British), 1948, pages 133–143.

"The Condensed Chemical Dictionary," 5th Edition, 1956, Reinhold Pub. Co.